United States Patent [19]

Viertel et al.

[11] Patent Number: 4,683,522
[45] Date of Patent: Jul. 28, 1987

[54] SUN VISOR FOR VEHICLES

[75] Inventors: Lothar Viertel, Berus/Überherrn; Klaus-Peter Kaiser, Wermelskirchen, both of Fed. Rep. of Germany

[73] Assignee: Gebr. Happich GmbH, Fed. Rep. of Germany

[21] Appl. No.: 752,385

[22] Filed: Jul. 3, 1985

[30] Foreign Application Priority Data

Jul. 28, 1984 [DE] Fed. Rep. of Germany ....... 3427952

[51] Int. Cl.⁴ .............................................. F21V 33/00
[52] U.S. Cl. .................................... 362/135; 362/140; 362/137; 296/974
[58] Field of Search ................. 362/74, 140, 141, 144, 362/135, 137, 142; 296/97 H, 97 R, 97 K

[56] References Cited

U.S. PATENT DOCUMENTS

| 4,213,169 | 7/1980 | Kempkers | 362/140 |
| 4,364,597 | 12/1982 | Viertel et al. | 362/137 |
| 4,479,172 | 10/1984 | Connor | 362/135 |
| 4,491,899 | 1/1985 | Fleming | 362/135 |
| 4,511,954 | 4/1985 | Marcus et al. | 362/144 |
| 4,541,663 | 9/1985 | Schwanitz | 362/144 |
| 4,564,234 | 1/1986 | Kaiser et al. | 296/97 H |

FOREIGN PATENT DOCUMENTS

| 2730926 | 1/1979 | Fed. Rep. of Germany . |
| 2453042 | 12/1980 | Fed. Rep. of Germany ... 296/97 H |
| 3045907 | 7/1982 | Fed. Rep. of Germany . |

Primary Examiner—James C. Yeung
Attorney, Agent, or Firm—Ostrolenk, Faber, Gerb & Soffer

[57] ABSTRACT

The disclosure concerns a vehicle sun visor having a recess in one of its surfaces and a housing in the recess where the bottom of the housing is a trough having a detent in one of its side walls and carrying a light source and an operating switch for the light source. The top is a insert which includes a detent clip to clip it to the bottom part. An opening in the top part provides access to a switch for the light source in the bottom part. A mirror is in the top part. An illumination window in the top part permits light to exit from the bottom part. There may be a point radiator for light at the illumination window. A displaceable cover over the mirror is spring-biased to translate open over the surface of the mirror to expose the mirror. There may be a point radiator for light at the illumination window. A spring-loaded knob connected with the cover holds the same closed and when the knob is operated, it releases the cover to be biased open by the rubber band spring.

6 Claims, 6 Drawing Figures

SUN VISOR FOR VEHICLES

BACKGROUND OF THE INVENTION

The present invention relates to a sun visor for vehicles having a flat sun-visor body which has an approximately rectangular peripheral contour. The visor body is provided with a recess in one of its two main surfaces. Within that recess, there is inserted a housing that is provided with a mirror and an illuminating device.

Sun visors for vehicles with a mirror and an illuminating device are known, for example, from Federal Republic of Germany DE-OS No. 27 30 926. With this known sun visor, however, it is not possible to selectively use the illuminating device. Instead, the source of light of the illuminating device is continously connected and operating when the sun-visor body is in its position of use, that is, when the visor body is in its position affording daylight blocking or dazzle protection. Furthermore, this sun visor does not have a mirror cover which is, however, frequently desired.

Another sun visor known from Federal Republic of Germany DE-OS No. 30 45 907 is equipped with a mirror which can be covered when the mirror is not in use. However, this visor lacks an illuminating device, so that the mirror cannot be used in the dark.

SUMMARY OF THE INVENTION

The object of the present invention is to provide a sun visor which combines the advantages of known sun visors, which is simple and inexpensive to manufacture and which, in addition, is characterized by simple operation and by an aesthetically pleasing appearance.

According to the invention, the housing for the mirror comprises a trough-shaped bottom part anchored in the sun-visor body and a top part detachably connected to the bottom part. Light sources and their switches are installed in the bottom part. The top part is developed as an insert unit and has a mirror, a displaceable cover for the mirror, illumination windows and a passage opening for the switches.

A sun visor according to the invention has various advantages. It is advantageous that the sources of light and the switches are arranged in the bottom part. In this way, all the electrical connections can be made in an easily viewed manner before the top part is connected to the bottom part. The switches permit the illuminating means to be operated individually. Of particular importance, the top part is developed as a structural unit which can be completely preassembled. This considerably simplifies the manufacture of the sun visor.

The detachable connection between the housing parts can be rapidly and easily produced. It can be effected because the bottom part has detent recesses on two wall parts opposite each other and the top part has clip projections which engage into the detent recesses.

In a further development of the invention, the illuminating windows are arranged directly over the sources of light, and one illuminating window is developed as a point radiator (lens). Provision can furthermore be made for the sources of light associated with the illuminating windows to be turned on and off independently of each other. Developing one of the illuminating windows as a point radiator makes it possible to use the illuminating means of the sun visor not only for using the mirror in the dark but also to use it as a reading light, which will be found advantageous by taxi drivers and others.

The displaceable cover of the mirror is moved back and forth in lateral grooves in the top part. The maximum width of opening of the cover is determined by a stop. In this case, a spring acts on the cover. The spring is tensioned when the cover is moved from the open position into the closed position. The cover is held in its open position by a spring-loaded pin which can be engaged in an opening in the cover. By pushing back the spring-loaded pin, the cover is brought into the open position as a result of the force of the tensioned spring. For releasing the spring-loaded pin, the cover can be provided with an actuating knob which can be moved against the free end of the spring-loaded pin. Releasing of the pin causes the cover to automatically move away from the mirror and exposes the mirror to view.

To satisfy the need for simple, inexpensive manufacture of the new sun visor, the spring which acts on the cover is a tension spring, preferably consisting of a rubber band. One end of the tension spring is preferably fastened to the region of the top rear edge of the cover. The other end is attached with mirror symmetry to the top part of the mirror in such a manner that when the tension spring is tensioned, the mirror is between the strands of the spring.

Other objects and features of the invention will be described below with reference to the accompanying drawings.

DESCRIPTION OF THE PREFERRED EMBODIMENT

Figure 1:
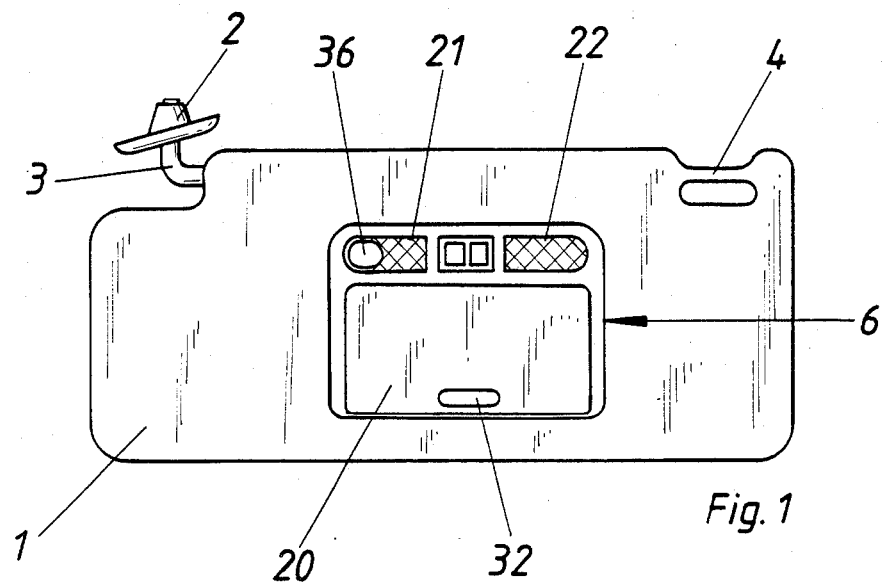
FIG. 1 is a plan view of a sun visor with the mirror cover closed.
Figure 2:
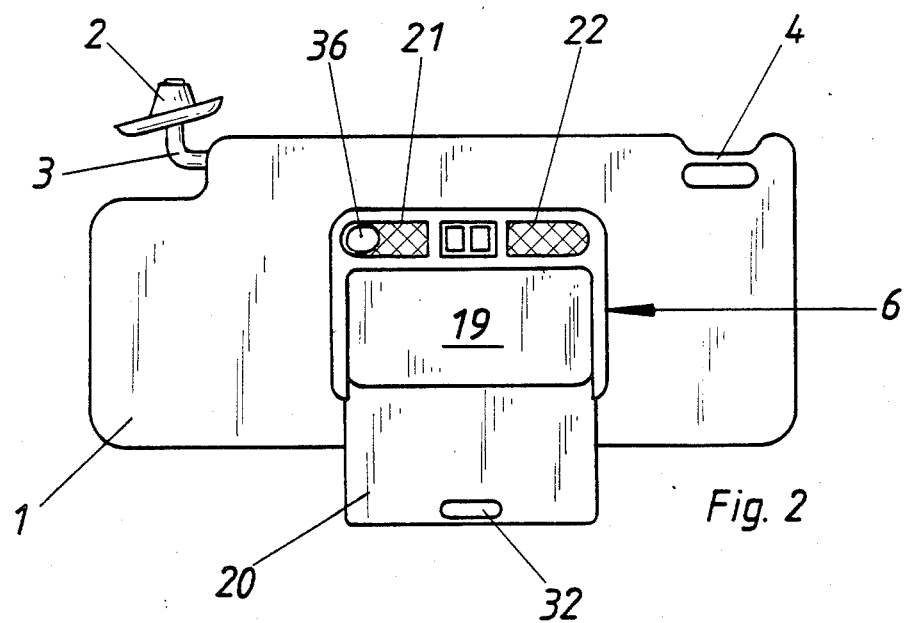
FIG. 2 is the same view of the sun visor of FIG. 1 but with the mirror cover open.
Figure 4:
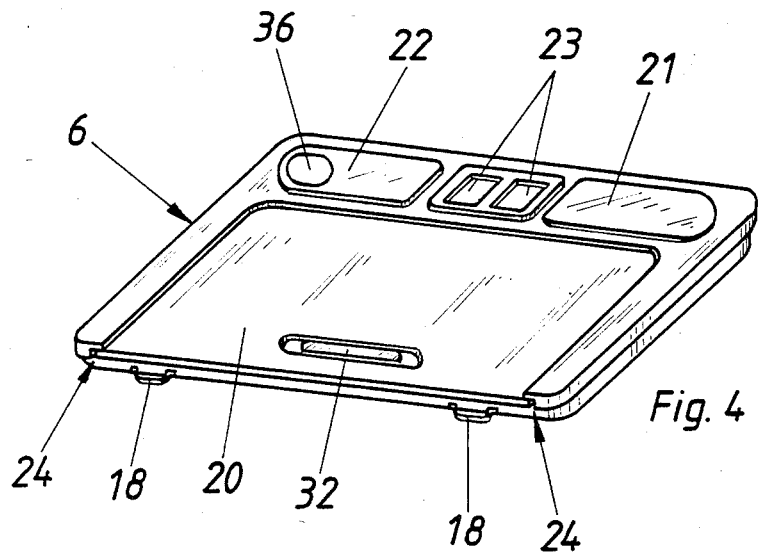
FIG. 4 shows the top part of the housing which corresponds to the bottom part shown in FIG. 3.

FIGS. 1 and 2 show a sun visor which comprises a sun-visor body 1 having a swivel bearing 2 located at the vehicle body (not shown), a swivel bearing shaft 3 extending from the vehicle body to the visor body at one end of the top edge of the body, and an outer support shaft 4 at the other end of the top edge of the body and which engages detachably in an outer support housing (also not shown). The sun-visor body 1 is of flat shape (see also FIG. 3) and has approximately rectangular contour.

Figure 3:
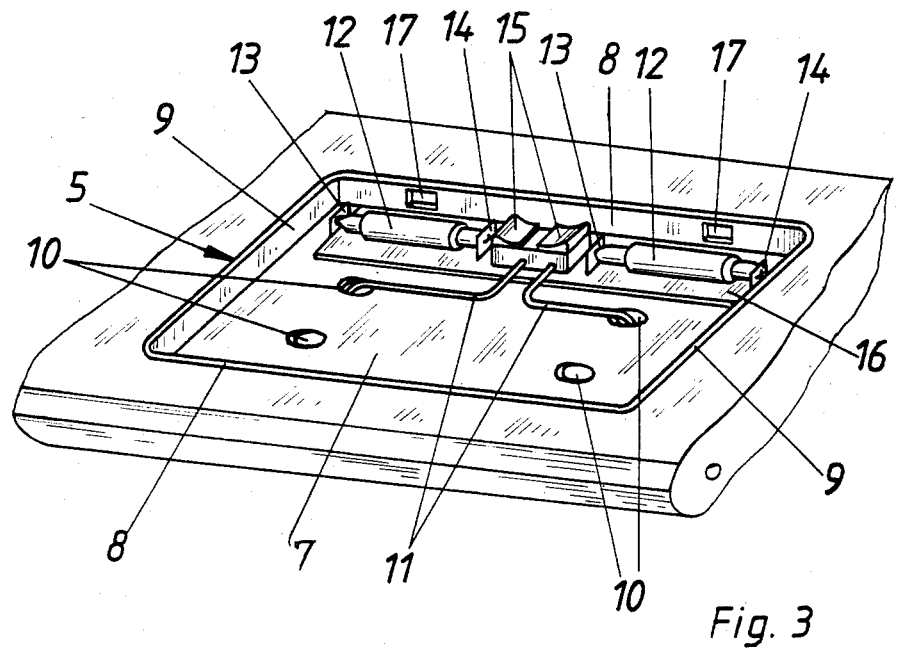
FIG. 3 is a partial view of the sun visor body with integrated bottom part of the housing.

In one wide side of the sun-visor body 1, a recess is provided. In the recess is disposed the bottom part 5 of a housing that is comprised of the bottom part 5 and a top part 6. As shown in FIG. 3, the bottom part 5 has a floor 7, and longitudinal side walls 8 and internal side walls 9 arranged, respectively, in pairs opposite each other. Openings 10 in the floor 7 enable the passage of electric wires 11. The electric wires are connected at one end to the electrical system of the car. This contact is effected, for instance, via the swivel-bearing shaft 3 and/or outer support shaft 4 in known manner. The other ends of the electric wires 11 are connected to contacts 13, 14 which support tubular bulbs 12, and switches 15 are interposed in the lines to the bulbs. The contacts 13, 14 and switches 15 are premounted on a bottom plate 16 together with corresponding wiring, so that the final mounting is limited to inserting the bottom plate 16 into the bottom part 7, clamping the tubular lamps 12 between the contacts 13, 14 and connecting the electric wires 11. The side walls 8 have detent recesses 17 for engaging clip projections 18 arranged on the top part 6. The bottom part 5 is developed in a trough-like fashion and has an approximately rectangular contour. It is made as a plastic injection molding.

Figure 5:
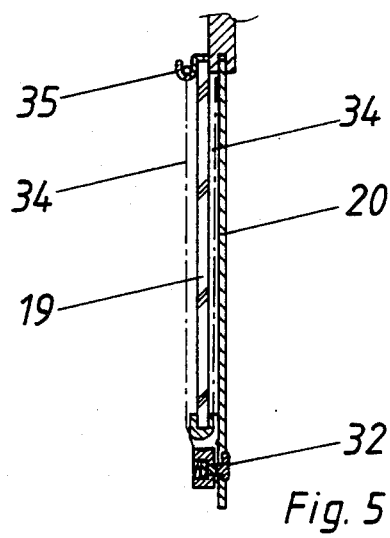
FIG. 5 is a vertical section through the housing, with mirror and cover.
Figure 6:
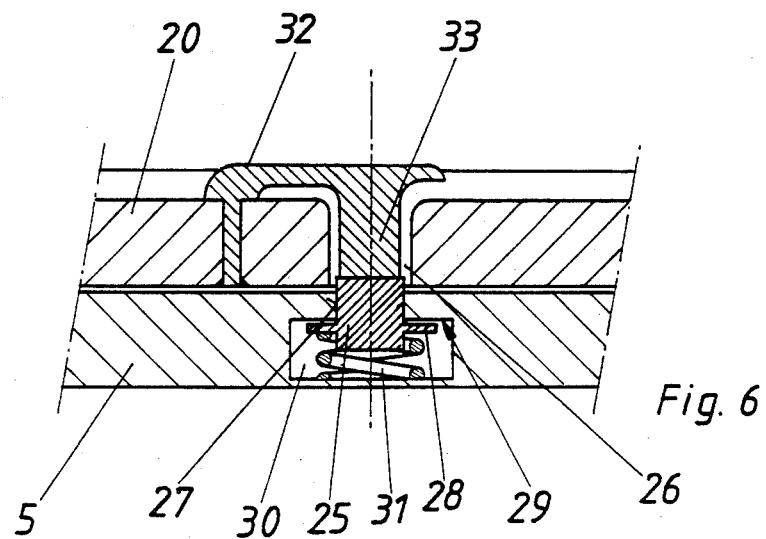
FIG. 6 shows, on a larger scale, the release mechanism for the cover.

The top part 6 of the housing is a completely premountable structural unit which, in detail, includes a makeup mirror 19 (see FIGS. 2 and 5), a displaceable cover 20 for the mirror 19, illuminating windows 21 and 22, and passage openings 23 for the switches 15. The top part 6 is also developed as a plastic injection molding.

The cover 20 also consists of a plastic injection molding. It is received for translation in guides 24 of the top part 6. The cover 20 can be moved from a closed, end-position shown in FIG. 1, which completely covers the mirror 19, into an open, end-position shown in FIG. 2, which reveals the mirror 19. In the open end-position, the cover extends beyond the bottom edge of the sun-visor body 1. The open, end-position of the cover 20 is defined by an end stop, not shown. However, it may comprise an abutment on the top end of the cover that engages an end piece with guide 24.

The cover 20 is held in its closed, end-position by a spring-loaded pin 25 which engages into an opening 26 which is formed as a continuous hole in the cover 20. The pin 25 passes through a hose 27 in the bottom part 5 and rests by means of a collar 28 formed on the pin 25 against the end wall 29 of widened portion 30 of the hole. On the end of the pin 25 extending beyond the collar 28, there is a coil compression spring 31 which urges the pin 25 outward, i.e. in the direction toward the cover 20. The cover 20 carries an actuating knob 32, which extends, by means of a pin 33, through the opening 26. By depressing the actuating knob 32, the pin 25 is moved out of the opening 26 against the force of the spring 31 and the locking of the cover 20 is thus released.

Upon depression of the actuating knob 32, the cover 20 should move automatically into the open position. For this purpose, one end of a tension spring 34, consisting preferably of a rubber cord or band, is fastened to the rear of the cover 20, in the region of its top edge. The other end of the tension spring is passed around the bottom edge of the mirror 19 and is fastened in the region of the top edge of the mirror 19 to an eye 35 provided there. The tension spring 34 is tensioned in the open position of the cover 20 and is more tensioned upon transfer of the cover into the closed position, in which the tension spring assumes the position shown in FIG. 5, in which the mirror 19 is located between the strands of the spring wrapped around the mirror.

One illuminating window is developed with a lens that forms a point radiator 36 so that the illuminating device can be used optionally either for illumination or as a reading lamp.

Although the present invention has been described in connection with a preferred embodiment thereof, many variations and modifications will now become apparent to those skilled in the art. It is preferred, therefore, that the present invention be limited not to the specific disclosure herein, but only by the appended claims.

What is claimed is:

1. A sun visor for a vehicle, comprising:
   a flat sun-visor body with two opposite main surfaces; a recess in one of the surfaces; a housing in the recess, a mirror in the housing; an illuminating device in the housing at the mirror;
   the housing comprising a trough-shaped bottom part attached to the visor body, a top part detachably connected to the bottom part; a light source in the bottom part;
   the top part is an insert; the mirror being included in the top part; a cover over the mirror, the cover displaceable over the mirror selectively to cover the mirror and to be off the mirror to expose the mirror; an illumination window for permitting light from the light source to shine through; and
   a spring attached to the cover for normally urging the cover into the open condition uncovering the mirror; releasable closure means for holding the cover closed against the bias of the spring; the closure comprising an opening in the bottom part and comprising a spring-loaded pin extending from the cover into the opening in the bottom part, the pin being shaped such that pushing upon the pin against the spring loading releases the cover to move open under the bias of the spring for the cover.

2. The sun visor of claim 1, wherein the spring for the cover is connected for being increasingly tensioned as the cover is closed.

3. The sun visor of claim 1, further comprising a knob in the cover for being movable against the pin for actuating the pin.

4. The sun visor of claim 1, wherein the spring for the cover is a tension spring.

5. The sun visor of claim 4, wherein the spring for the cover is a rubber band which is stretched as the band is tensioned.

6. The sun visor of claim 4, wherein the tension spring includes one end that is fastened to that edge of the cover that is in the direction toward which the cover is closed; the tension spring included another end which is fastened at the top part of the mirror, such that the mirror is between the strands of the spring, with the spring tensioned.

\* \* \* \* \*